Oct. 31, 1961     R. A. GULICK     3,006,500
BONNET GASKET
Filed April 6, 1959     2 Sheets-Sheet 2
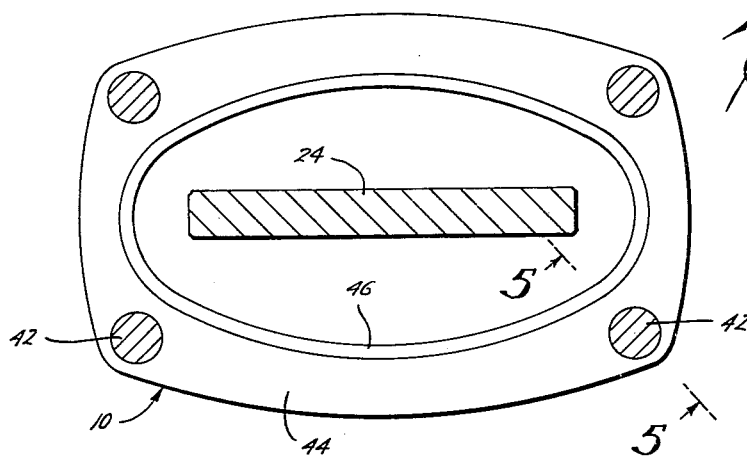
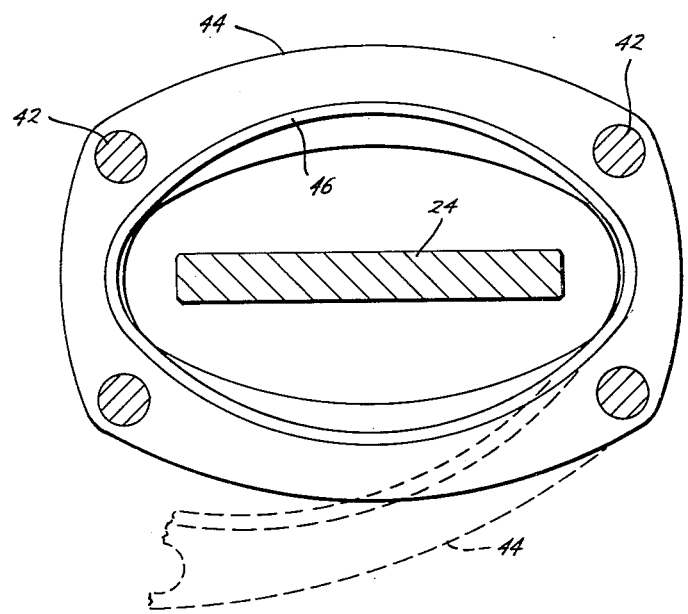
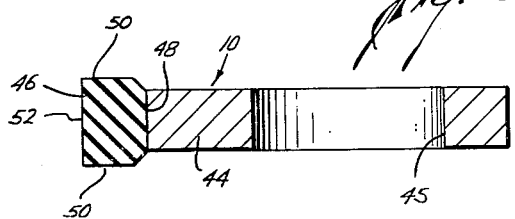
Ronald A. Gulick
INVENTOR.
BY
ATTORNEY

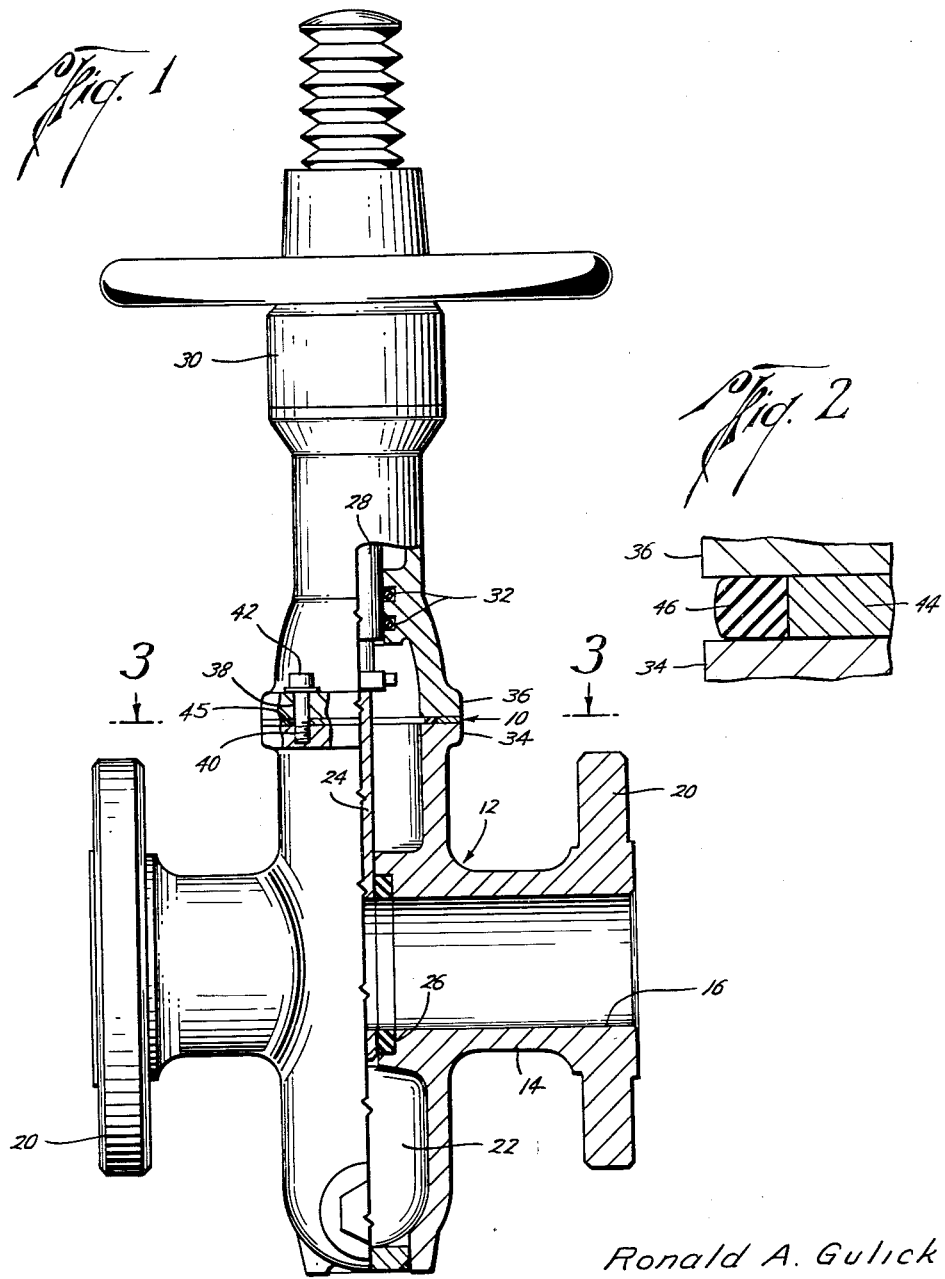

United States Patent Office 3,006,500
Patented Oct. 31, 1961

3,006,500
BONNET GASKET
Ronald A. Gulick, Houston, Tex., assignor to ACF Industries, Incorporated, New York, N.Y., a corporation of New Jersey
Filed Apr. 6, 1959, Ser. No. 804,237
4 Claims. (Cl. 220—46)

This invention relates to a gasket which forms a seal between the opening of the valve chamber and the bonnet which closes the chamber.

Valve bodies are customarily provided with an opening through which the valve operating mechanism is inserted. This opening is closed by a bonnet or cap through which the valve stem projects. One common method of attaching the valve bonnet to the body is by the use of bolts which extend through a flange surrounding the valve bonnet. In order to seal the joint formed by the bonnet and the body, a seal ring is customarily used. This ring may be a metallic ring such as an API ring which is in common use throughout the oil industry, or a simple flat soft metal ring. The API ring is adapted to be engaged between annular grooves which are formed in the flanges surrounding the valve body and valve bonnet. Bonnets using the API ring are expensive to manufacture since a groove has to be formed in each element to receive the ring. When using any type metallic seal ring, sufficient load has to be applied to deform the surface of the ring to effect a metal-to-metal seal. Additionally, the bolts used to secure the flanges together have to be pre-stressed since any appreciable spreading apart of the flanges will create a leak. Various attempts have been made to use resilient members in connection with such rings as shown in U.S. Patents 2,330,425 and 2,687,909.

Also, various attempts have been made to use resilient seals as a bonnet gasket. However, if an O-ring seal is used, it is mandatory for economical machining to have a circular opening, and even in such event it is difficult to retain the O-ring in its groove while assembling the bonnet. Additionally, if the only seal used is of resilient material, high temperature may destroy the seal and a disastrous leak result.

The present invention discloses a bonnet gasket which is formed of a rigid portion having attached to its inner periphery a resilient deformable portion. The resilient portion is squeezed sufficiently to build up within the resilient medium sufficient pressure to flow the material into any minute crevices in the flanges thereby affecting an initial seal. Thereafter, the deformable material will work as a pressure sealing gasket and as pressure develops within the body, it will act on the deformable material to make a tighter seal. The gasket will hold vacuum or pressure. In the event that the resilient portion is destroyed, the rigid portion will provide a secondary metal-to-metal seal. The rigid portion is so designed that it will fail at a predetermined internal pressure which is less than the pressure which will permanently deform the body.

It is a primary object of the present invention to provide a pressure sealing gasket for a valve bonnet closure.

It is another object to provide a pressure sealing gasket formed of a rigid outer portion and a resilient deformable inner portion capable of withstanding either vacuum or pressure.

It is another object to provide a bonnet gasket having a primary resilient deformable seal and a secondary metal-to-metal seal.

It is a further object to provide a pressure sealing gasket which will act as a safety device and which will fail at a pressure less than the pressure which will permanently deform the valve body.

It is a further object to provide a pressure sealing gasket which is easy to manufacture and install.

It is a more specific object to provide a pressure sealing gasket for a valve bonnet closure which has a uniquely constructed deformable element.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specification, wherein:

FIG. 1 is a front view of a gate valve equipped with the gasket of the present invention. Certain portions are in section to more fully illustrate the invention.

FIG. 2 is a broken detailed enlarged sectional view of the novel gasket and flanges, taken generally along the lines of 2—2 of FIG. 1.

FIG. 3 is a diagrammatic view taken generally along lines 3—3 of FIG. 1.

FIG. 4 is a view similar to FIG. 3 showing the safety feature of the gasket.

FIG. 5 is an enlarged detail of the gasket prior to assembly into the closure joint.

Referring now to the drawings, FIG. 1 shows the improved bonnet gasket 10 incorporated in a gate valve 12. The gate valve 12 is comprised of a body 14 having aligned flow passages 16—16. The outer ends of the passages 16—16 are shown terminating in flanges 20—20 permitting the valve 12 to be connected to a flow system. Naturally, any other of the various well known means of finishing ends for connection to a flow system may be utilized.

The interior of the body 14 is provided with a valve chamber 22 to receive a movable valve member or gate 24 which cooperates with seats 26 to control the flow as is well known in the art. The upper end of the gate 24 is attached to means, such as a stem 28, for raising and lower the gate as is well known in the art. The stem 28 extends through a bonnet 30 and is packed off by O-rings 32. The valve chamber 22 terminates in an opening which is surrounded by an enlarged portion or flange 34. The bottom of the bonnet 30 is likewise provided with an enlarged portion or flange 36. The novel bonnet gasket 10 is interposed between the top of the valve body 14 and bottom of the bonnet 30. The bonnet flange 36 is provided with a number of holes 38 and the body flange 34 is provided with registering threaded holes 40. The bonnet gasket 10 is also provided with holes 45 which register with the holes 38 and 40. Threaded members 42 are passed through the holes 38 and 45 and threadingly engaged with the threaded holes 40 to draw the bonnet and body together.

The bonnet gasket 10, as can be seen more clearly in FIG. 5, is formed of a rigid portion 44 which may be stamped out of sheet metal and which conforms to the outer configuration of the bonnet and body. It is in the rigid portion 44 that the holes 45 are located. Around the inner periphery of the rigid portion 44 there is a resilient deformable portion 46 which may be formed of Hycar, neoprene, natural rubber or any of the other well known resilient deformable materials. The side 48 of resilient portion 46 is of the same thickness as the rigid portion 44 and is securely bonded to the inner periphery of the rigid portion 44. The resilient portion then angularly diverges at approximately 45° from the side 48 to two parallel faces 50—50 which are also parallel to the faces of the rigid portion. The resilient portion terminates in a side 52 which is parallel to the side 48. The thickness of the resilient portion between the faces 50—50 is approximately one and a half to one and three quarters that of the rigid member 44 so that when the flanges 34 and 36 are drawn together by the threaded member 42 to seat against the rigid portion 44, the resilient portion is compressed approximately 30 to 45%. This interference builds up sufficient internal pressure within the medium to cause the deformable material to flow into any minute crevices in the face of the flanges 34—36 and thereby establish an initial seal, see FIG. 2. The gasket 10 should be so proportioned that the resilient portion will move toward the chamber 22 and will approach but not extend into the chamber 22. Thereafter, the gasket 10 becomes pressure sealing, that is, any internal pressure in the valve chamber 22 acts against the deformable material 46 and builds up even greater sealing pressures. It has been found that with the particular design above described that the resilient portion will become uniformly loaded upon tightening of the flanges. The bonding of side 48 to the inner periphery of the rigid portion 44 will not let the deformable material 46 escape. Since the resilient portion has angularly diverging sides, the pressure against the flanges will be highest directly adjacent to side 48 and therefore the seal will hold both vacuum and pressure. Unlike API and other metallic ring seals, it is not absolutely necessary to apply the same load to all bolts which is difficult to obtain without actually measuring bolt elongation, torque being an unreliable method of measurement of true load. It is only necessary that the body and bonnet flanges 34 and 36 be brought together sufficiently to seat on the rigid portion 44, and while equal tightness is always desirable, unevenness will not affect the operation of the gasket. Since the resilient material is bonded to the inner periphery of the rigid portion 44, assembly is not tedious as in the assembly of an O-ring type seal where the O-ring must be held securely in position while the flanges are being tightened. Since the flanges 34 and 36 seat on the rigid portion 44, such portion will act like a flat gasket establishing a secondary metal-to-metal seal, should the resilient portion 46 be destroyed by chemical action or high temperature. While such seal may not be drop tight, it will contain the internal pressure until action can be taken to stop the flow into the valve and the gasket changed. Also, the residue of the charred resilient material will tend to aid in the sealing.

The bonnet gasket 10 performs another function, i.e., it acts as a rupture plate. The holes 45 formed in the rigid portion 44 produce a reduction in section and a notch effect whereby there is a concentration of stress at such point. As previously mentioned, the gasket 10 acts as a pressure sealing gasket and as internal pressure in the chamber 22 increases, pressure on the resilient portion 46 increases. This force is backed by the rigid portion 44 so that within design limits of the rigid portion 44 the effect is to increase the pressure which the resilient material exerts against the flanges 34 and 36 and inner periphery of the rigid portion 44. As previously mentioned, the rigid portion 44 is designed to fail at a predetermined internal pressure which is less than the internal pressure which will deform the body; therefore, as the pressure increases, the rigid portion between two holes 42 responds as a uniformly loaded beam and will deform between the restraining ends, portions restrained by bolts 42. Additional pressure will cause the rigid portion 44 to fail at the reduced portion 45 thereby relieving the backup of the resilient material and relieving the pressure, see FIG. 4.

A valve having a bonnet gasket constructed according to the present invention was subjected to a freezing test. The valve chamber 22 was filled with water and the temperature was then lowered below freezing. As the pressure on the gasket increased, the rigid portion first bowed between the two bolts as shown in FIG. 4 and finally broke at the reduced section as is also shown in FIG. 4. Breakage of the rigid portion destroyed the backup for the resilient material and excess pressure was relieved without any permanent distortion of the body. Accordingly, all that was necessary to restore the valve to working condition was to replace the bonnet gasket 10.

As can be seen from the above, the present invention provides a bonnet gasket formed of an outer rigid portion and resilient inner portion which is easy to manufacture and assemble, which provides a primary resilient seal and secondary metal-to-metal seal and which acts as a safety device to prevent permanent deformation of the body.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A flange connection for a bolted flanged opening of a pressure vessel comprising a pressure vessel body having an opening surrounded by a flange provided with a multiplicity of bolt holes, a bonnet for closing said opening, the bonnet being surrounded by a flange having bolt holes registering with the bolt holes in the flange surrounding the body, a gasket interposed between said flanges, the gasket comprising a rigid portion provided with holes which register with the holes in the flanges and a continuous resilient deformable portion secured to the inner periphery of the rigid portion, the resilient deformable portion having two parallel sides one being attached to the inner periphery of the rigid portion and the other being the bore of the gasket, the side attached to the inner periphery being of the same axial length as the rigid portion, the resilient portion then angularly diverging from said side to two parallel faces which are parallel to the plane of the rigid portion, the thickness of the resilient deformable portion at the parallel faces being substantially greater than the rigid portion so that when the flanges are drawn together the resilient portion will be under a relatively uniform load and approaches but does not extend past the inner periphery of the flanges and means passing through said bolt holes to draw said flanges together.

2. The structure specified in claim 1 characterized in that the strength of the rigid portion is such that it will yield under a predetermined internal pressure which is less than the pressure which will permanently deform the vessel.

3. A flange connection for a bolted flanged opening of a valve body comprising a valve body having a valve chamber with a generally elliptical opening surrounded by a generally rectangular flange provided with four threaded apertures, one located in each corner of said flange, a bonnet for closing said opening, the bonnet being surrounded by a generally rectangular flange having unthreaded apertures registering with the threaded aperture in the flange surrounding the body, a gasket interposed between said flanges, the gasket comprising a rigid portion provided with unthreaded apertures which register with the apertures in the flanges and a continuous resilient deformable portion secured to the inner periphery of the rigid portion, the resilient deformable portion having two parallel sides one being attached to the inner periphery of the rigid portion and the other being the bore of the gasket, the side attached to the inner periphery being of the same size as the rigid portion, the resilient portion then angularly diverging from said side to two parallel faces which are parallel to the plane of the rigid portion, the thickness of the resilient deformable portion at the parallel faces being approximately one and two-thirds times greater than the rigid portion and threaded fasteners securing the flanges together in the condition where the flanges abut the rigid portion whereby the resilient portion is under a relatively uniform load and approaches but does not extend pass the inner periphery of the flanges.

4. The structure specified in claim 3 characterized in that the rigid portion is reduced in cross sectional area at the four apertures whereby the strength of the two longer resilient portions is such that one of such portions will yield under a predetermined internal pressure to relieve the pressure in the body, such predetermined pressure being less than the pressure which will permanently deform the valve body.

References Cited in the file of this patent

UNITED STATES PATENTS

| | | |
|---|---|---|
| 1,191,651 | Bauroth | July 18, 1916 |
| 1,888,459 | Greve | Nov. 22, 1932 |
| 2,309,446 | Ekkebus | Jan. 26, 1943 |
| 2,455,982 | Dowty | Dec. 14, 1948 |
| 2,513,178 | Jackson | June 27, 1950 |
| 2,744,654 | Swerdlow | May 8, 1956 |